(12) United States Patent
Brown et al.

(10) Patent No.: US 7,603,556 B2
(45) Date of Patent: Oct. 13, 2009

(54) CHALLENGE RESPONSE-BASED DEVICE AUTHENTICATION SYSTEM AND METHOD

(75) Inventors: Michael K. Brown, Kitchener (CA);
Michael S. Brown, Waterloo (CA);
Michael G. Kirkup, Waterloo (CA);
Herbert A. Little, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 598 days.

(21) Appl. No.: 10/996,369

(22) Filed: Nov. 26, 2004

(65) Prior Publication Data

US 2005/0250473 A1    Nov. 10, 2005

Related U.S. Application Data

(60) Provisional application No. 60/568,119, filed on May 4, 2004.

(51) Int. Cl.
*H04L 9/32* (2006.01)
(52) U.S. Cl. .............................. 713/169; 726/2; 726/3; 726/4
(58) Field of Classification Search ................. 713/168, 713/169
See application file for complete search history.

(56) References Cited

U.S. PATENT DOCUMENTS

| 5,418,854 | A | | 5/1995 | Kaufman et al. | |
|---|---|---|---|---|---|
| 5,434,918 | A | * | 7/1995 | Kung et al. | 713/169 |
| 5,491,752 | A | * | 2/1996 | Kaufman et al. | 380/30 |
| 5,666,415 | A | * | 9/1997 | Kaufman | 713/159 |
| 5,721,779 | A | | 2/1998 | Funk | |
| 6,064,736 | A | * | 5/2000 | Davis et al. | 713/155 |
| 6,542,610 | B2 | | 4/2003 | Traw et al. | |
| 6,826,686 | B1 | * | 11/2004 | Peyravian et al. | 713/168 |
| 7,062,490 | B2 | * | 6/2006 | Adya et al. | 707/10 |
| 2002/0071566 | A1 | * | 6/2002 | Kurn | 380/281 |
| 2003/0065956 | A1 | | 4/2003 | Belapurkar et al. | |
| 2004/0158715 | A1 | * | 8/2004 | Peyravian et al. | 713/171 |
| 2005/0215233 | A1 | * | 9/2005 | Perera et al. | 455/411 |

FOREIGN PATENT DOCUMENTS

WO    WO 03/019856 A2    3/2003

* cited by examiner

*Primary Examiner*—Ponnoreay Pich
(74) *Attorney, Agent, or Firm*—Jenna L. Wilson; Dimock Stratton LLP

(57) ABSTRACT

A challenge response scheme authenticates a requesting device by an authenticating device. The authenticating device generates and issues a challenge to the requesting device. The requesting device combines the challenge with a hash of a password provided by a user, and the combination is further hashed in order to generate a requesting encryption key used to encrypt the user supplied password. The encrypted user supplied password is sent to the authenticating device as a response to the issued challenge. The authenticating device generates an authenticating encryption key by generating the hash of a combination of the challenge and a stored hash of an authenticating device password. The authenticating encryption key is used to decrypt the response in order to retrieve the user-supplied password. If the user-supplied password hash matches the stored authenticating device password hash, the requesting device is authenticated and the authenticating device is in possession of the password.

24 Claims, 5 Drawing Sheets

CHALLENGE RESPONSE-BASED DEVICE AUTHENTICATION SYSTEM AND METHOD

REFERENCE TO PRIOR APPLICATIONS

This application claims priority from U.S. Application No. 60/568,119, filed May 4, 2004.

BACKGROUND

1. Technical Field

The present invention relates generally to the field of communications, and in particular to a challenge response system and method.

2. Description of the Related Art

Mobile devices, such as personal digital assistants (PDAs), cellular phones, wireless communication devices and the like, are occasionally connected to a user's desktop system in order to synchronize information between the user's desktop system and their mobile device. Information such as a user's calendar, task list and phone book entries are examples of information that is routinely synchronized between the desktop system and the mobile device.

Such information is usually of a sensitive nature and should be secured. The user is thus provided with an option to specify a device password on the mobile device in order to secure the mobile device and prevent use of the device without knowledge of the device password.

When the mobile device is connected to the desktop system in order to synchronize information, the mobile device issues a challenge to the desktop system in order to determine if the desktop system is authorized to initiate a connection with the mobile device. The desktop system then provides a response to the mobile device. If the response provided by the desktop system matches the response expected by the mobile device, then the desktop system is allowed to connect to the mobile device and proceed to synchronize information.

Typically, the issued challenge is a request for the hash of the user password. A hash function, such as SHA-1, is a one-way function that takes an input or varying length and converts it into a unique output. The hash of the password provided by the user of the desktop system initiating a connection is sent to the device in response to the challenge by the mobile device. If the response matches the stored hash of the device password, the desktop system is allowed to connect to the mobile device and proceed to synchronize information.

The device password is typically not stored on the device. Only the hash of the device password is stored on the device. However, since the device password itself is not stored on the device, certain operations requiring use of the device password cannot be performed if only the hash of the device password is available on the mobile device. For instance, if the information on the mobile device is encrypted using the device password, then the device password must be supplied in order to decrypt the information prior to synchronizing with the desktop system.

SUMMARY

In accordance with the teachings provided herein, systems and methods are provided for a challenge response scheme within which a secret, such as a password, may be securely transferred between a requesting device and an authenticating device. As an example of a system and method, the authenticating device generates a challenge that is issued to the requesting device. The requesting device combines the challenge with a hash of a password provided by a user of the requesting device, and the combination of the hash of the password and the challenge is further hashed in order to generate a requesting encryption key that is used to encrypt the user supplied password. The encrypted user supplied password is sent to the authenticating device as the response to the issued challenge. The authenticating device generates an authenticating encryption key by generating the hash of a combination of the challenge and a stored hash of an authenticating device password. The authenticating encryption key is used to decrypt the response in order to retrieve the user supplied password. If a hash of the user supplied password matches the stored hash of the authenticating device password, then the requesting device has been authenticated and the authenticating device is in possession of the password.

According to an aspect of the invention there is provided a method for authentication of a requesting device by an authenticating device, the requesting device and the authenticating device each being operative to carry out a one-way hash operation and to carry out a key-based encryption operation, the authenticating device storing a hash of a defined password generated by applying the hash operation to the defined password, the authenticating device being further operative to carry out a key-based decryption operation for decrypting values obtained from the encryption operation, the method including the steps of:

the requesting device receiving a user password and carrying out the hash operation on the user password to obtain a hash of the user password, the authenticating device determining and transmitting a challenge to the requesting device;

the requesting device receiving the challenge and defining a requesting encryption key by carrying out the hash operation on a combination of the challenge and the hash of the user password, the requesting device carrying out the encryption operation using the requesting encryption key to encrypt the user password, the requesting device transmitting a response including the encrypted user password to the authenticating device, the authenticating device receiving the response and defining an authenticating encryption key by carrying out the hash operation on a combination of the challenge and the hash of the defined password;

the authenticating device using the authenticating encryption key in the decryption operation to decrypt the response to obtain a decrypted user password and carrying out the one-way hash operation on the decrypted user password;

the authenticating device comparing the hash of the decrypted user password with the hash of the defined password to authenticate the requesting device when the comparison indicates a match.

According to a further aspect of the invention there is provided the above method further including the step of the authenticating device using the decrypted user password to carry out operations on the authenticating device.

According to a further aspect of the invention there is provided the above method in which the authenticating device is a wireless handheld device and the requesting device is a desktop computer and in which the authentication of the requesting device is required to establish a connection between the wireless handheld device and the requesting device, the method further including the step of the requesting device sending a connection request to the authenticating device prior to the authenticating device determining a challenge and in which the step of authenticating the requesting device includes the step of refusing to establish a connection when the hash of the decrypted user password does not match the hash of the defined password.

According to a further aspect of the invention there is provided a computing device program product including code operative to perform the above methods.

According to a further aspect of the invention there is provided a system for an authentication device to authenticate a requesting device, including:

a challenge generator for generating a challenge, a communications link for transmitting the challenge to the requesting device and receiving a response to the challenge from the requesting device, the response including a requesting password encrypted using a requesting encryption key, the requesting encryption key including a hash of a combination of the challenge and a hash of the requesting password;

a hash generator for generating an authenticating encryption key by hashing a combination of the challenge and a hash of a predetermined password;

a decryptor for decrypting the encrypted requesting password using the authenticating encryption key to obtain a decrypted response; and a comparator for comparing a hash of the decrypted response with the hash of the predetermined password, whereby if the hash of the decrypted requesting password matches the hash of the predetermined password, the requesting device is authenticated.

According to a further aspect of the invention there is provided a method for securely transmitting information to a receiving device, the receiving device being provided with a hash of the information, a random number, and a receiving encryption key including a hash of the random number and the hash of the information, including the steps of:

receiving a random number from the receiving device;

encoding the information to produce a hash of the information;

combining the random number with the hash of the information;

hashing the combined random number and hash of the information to produce a transmitting encryption key;

encrypting the information using the transmitting encryption key;

transmitting the encrypted information to the receiving device for decryption by the receiving device using the receiving encryption key.

According to a further aspect of the invention there is provided a method for a requesting device to be authenticated by an authenticating device, the requesting device receiving a user password, the authenticating device being provided with a hash of a predetermined password, a random number, and a receiving encryption key including a hash of the random number and the hash of the predetermined password, including the steps of the requesting device:

receiving a random number from the authenticating device;

encoding the user password to produce a hash of the user password;

combining the random number with the hash of the user password;

hashing the combined random number and hash of the user password to produce a transmitting encryption key;

encrypting the user password using the transmitting encryption key;

transmitting the encrypted user password to the authenticating device for authentication by decryption by the authenticating device using the receiving encryption key.

According to a further aspect of the invention there is provided a method for authentication of a requesting device by an authenticating device, the requesting device and the authenticating device each being operative to carry out a one-way hash operation and to carry out a key-based encryption operation, the authenticating device storing a hash of a defined password generated by applying the hash operation to the defined password, the authenticating device being further operative to carry out a key-based decryption operation for decrypting values obtained from the encryption operation, the method including the steps of the authenticating device:

determining and transmitting a challenge to the requesting device;

receiving a response from the requesting device, the response including a requesting encryption key determined by carrying out the hash operation on a combination of the challenge and a hash of a received user password, the hash being defined by carrying out the hash operation on the received user password, defining an authenticating encryption key by carrying out the hash operation on a combination of the challenge and the hash of the defined password;

using the authenticating encryption key in the decryption operation to decrypt the response to obtain a decrypted user password and carrying out the one-way hash operation on the decrypted user password;

comparing the hash of the decrypted user password with the hash of the defined password to authenticate the requesting device when the comparison indicates a match.

As will be appreciated, the invention is capable of other and different embodiments, and its several details are capable of modifications in various respects, all without departing from the spirit of the invention. Accordingly, the drawings and description of the preferred embodiments set forth below are to be regarded as illustrative in nature and not restrictive.

DETAILED DESCRIPTION OF THE DRAWINGS

Figure 1:
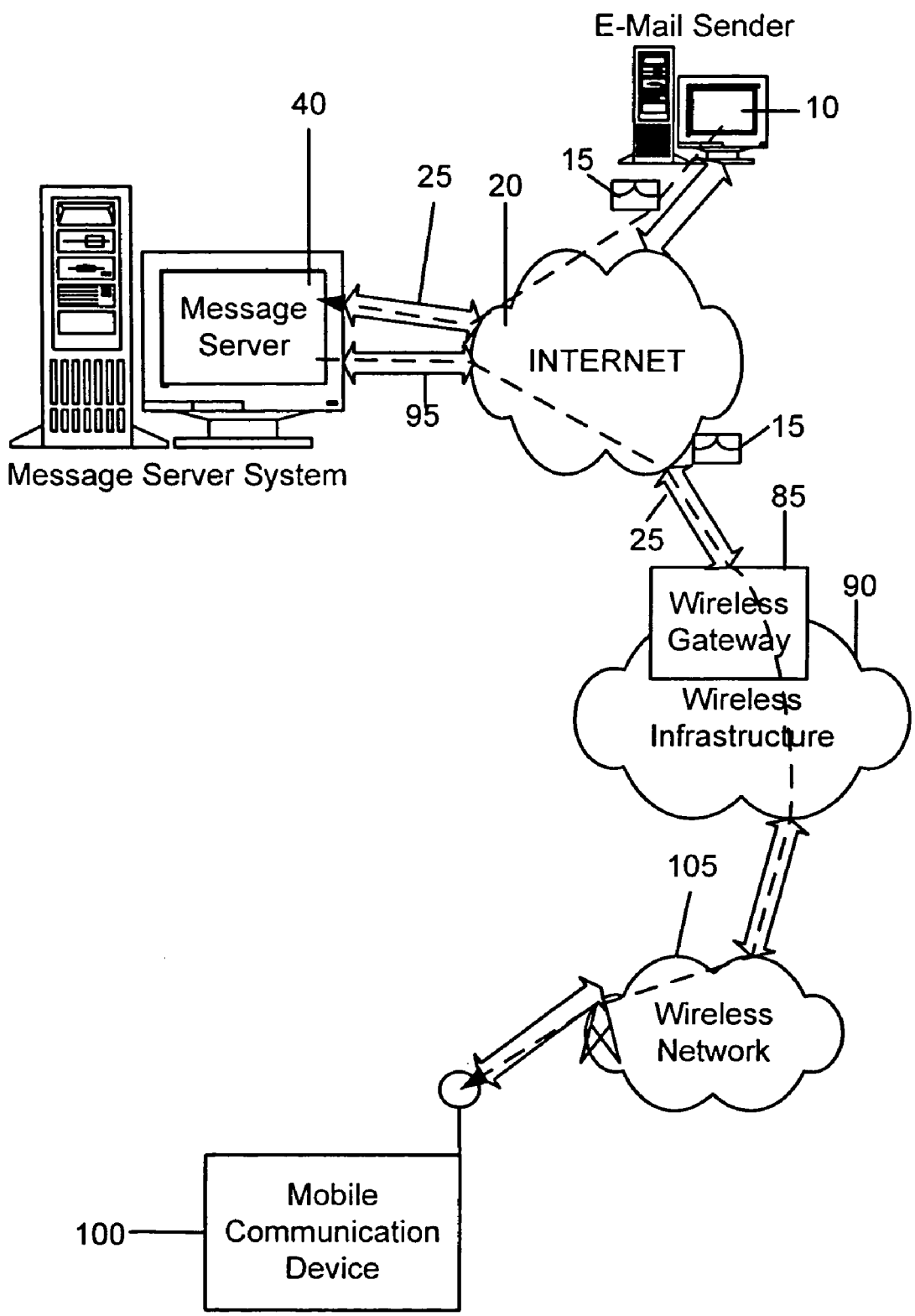
FIG. 1 is a block diagram of a communication system for use with a requesting device and authenticating device.

FIG. 1 is an overview of an example communication system in which a wireless communication device may be used. One skilled in the art will appreciate that there may be hundreds of different topologies, but the system shown in FIG. 1 helps demonstrate the operation of the encoded message processing systems and methods described in the present application. There may also be many message senders and recipients. The simple system shown in FIG. 1 is for illustrative purposes only, and shows perhaps the most prevalent Internet e-mail environment where security is not generally used.

FIG. 1 shows an e-mail sender 10, the Internet 20, a message server system 40, a wireless gateway 85, wireless infrastructure 90, a wireless network 105 and a mobile communication device 100.

An e-mail sender system 10 may, for example, be connected to an ISP (Internet Service Provider) on which a user of the system 10 has an account, located within a company, possibly connected to a local area network (LAN), and connected to the Internet 20, or connected to the Internet 20 through a large ASP (application service provider) such as AMERICA ONLINE® (AOL). Those skilled in the art will appreciate that the systems shown in FIG. 1 may instead be connected to a wide area network (WAN) other than the Internet, although e-mail transfers are commonly accomplished through Internet-connected arrangements as shown in FIG. 1.

The message server 40 may be implemented, for example, on a network computer within the firewall of a corporation, a computer within an ISP or ASP system or the like, and acts as the main interface for e-mail exchange over the Internet 20. Although other messaging systems might not require a message server system 40, a mobile device 100 configured for receiving and possibly sending e-mail will normally be associated with an account on a message server. Perhaps the two most common message servers are MICROSOFT® EXCHANGE and LOTUS DOMINO®. These products are often used in conjunction with Internet mail routers that route and deliver mail. These intermediate components are not shown in FIG. 1, as they do not directly play a role in the secure message processing described below. Message servers such as server 40 typically extend beyond just e-mail sending and receiving; they also include dynamic database storage engines that have predefined database formats for data like calendars, to-do lists, task lists, e-mail and documentation.

The wireless gateway 85 and infrastructure 90 provide a link between the Internet 20 and wireless network 105. The wireless infrastructure 90 determines the most likely network for locating a given user and tracks the user as they roam between countries or networks. A message is then delivered to the mobile device 100 via wireless transmission, typically at a radio frequency (RF), from a base station in the wireless network 105 to the mobile device 100. The particular network 105 may be virtually any wireless network over which messages may be exchanged with a mobile communication device.

As shown in FIG. 1, a composed e-mail message 15 is sent by the e-mail sender 10, located somewhere on the Internet 20. This message 15 is normally fully in the clear and uses traditional Simple Mail Transfer Protocol (SMTP), RFC822 headers and Multipurpose Internet Mail Extension (MIME) body parts to define the format of the mail message. These techniques are all well known to those skilled in the art. The message 15 arrives at the message server 40 and is normally stored in a message store. Most known messaging systems support a so-called "pull" message access scheme, wherein the mobile device 100 must request that stored messages be forwarded by the message server to the mobile device 100. Some systems provide for automatic routing of such messages which are addressed using a specific e-mail address associated with the mobile device 100. In a preferred embodiment described in further detail below, messages addressed to a message server account associated with a host system such as a home computer or office computer which belongs to the user of a mobile device 100 are redirected from the message server 40 to the mobile device 100 as they are received.

Regardless of the specific mechanism controlling the forwarding of messages to the mobile device 100, the message 15, or possibly a translated or reformatted version thereof, is sent to the wireless gateway 85. The wireless infrastructure 90 includes a series of connections to wireless network 105. These connections could be Integrated Services Digital Network (ISDN), Frame Relay or T1 connections using the TCP/IP protocol used throughout the Internet. As used herein, the term "wireless network" is intended to include three different types of networks, those being (1) data-centric wireless networks, (2) voice-centric wireless networks and (3) dual-mode networks that can support both voice and data communications over the same physical base stations. Combined dual-mode networks include, but are not limited to, (1) Code Division Multiple Access (CDMA) networks, (2) the Groupe Special Mobile or the Global System for Mobile Communications (GSM) and the General Packet Radio Service (GPRS) networks, and (3) future third-generation (3G) networks like Enhanced Data-rates for Global Evolution (EDGE) and Universal Mobile Telecommunications Systems (UMTS). Some older examples of data-centric network include the Mobitex™ Radio Network and the DataTAC™ Radio Network. Examples of older voice-centric data networks include Personal Communication Systems (PCS) networks like GSM, and TDMA systems.

Figure 2:
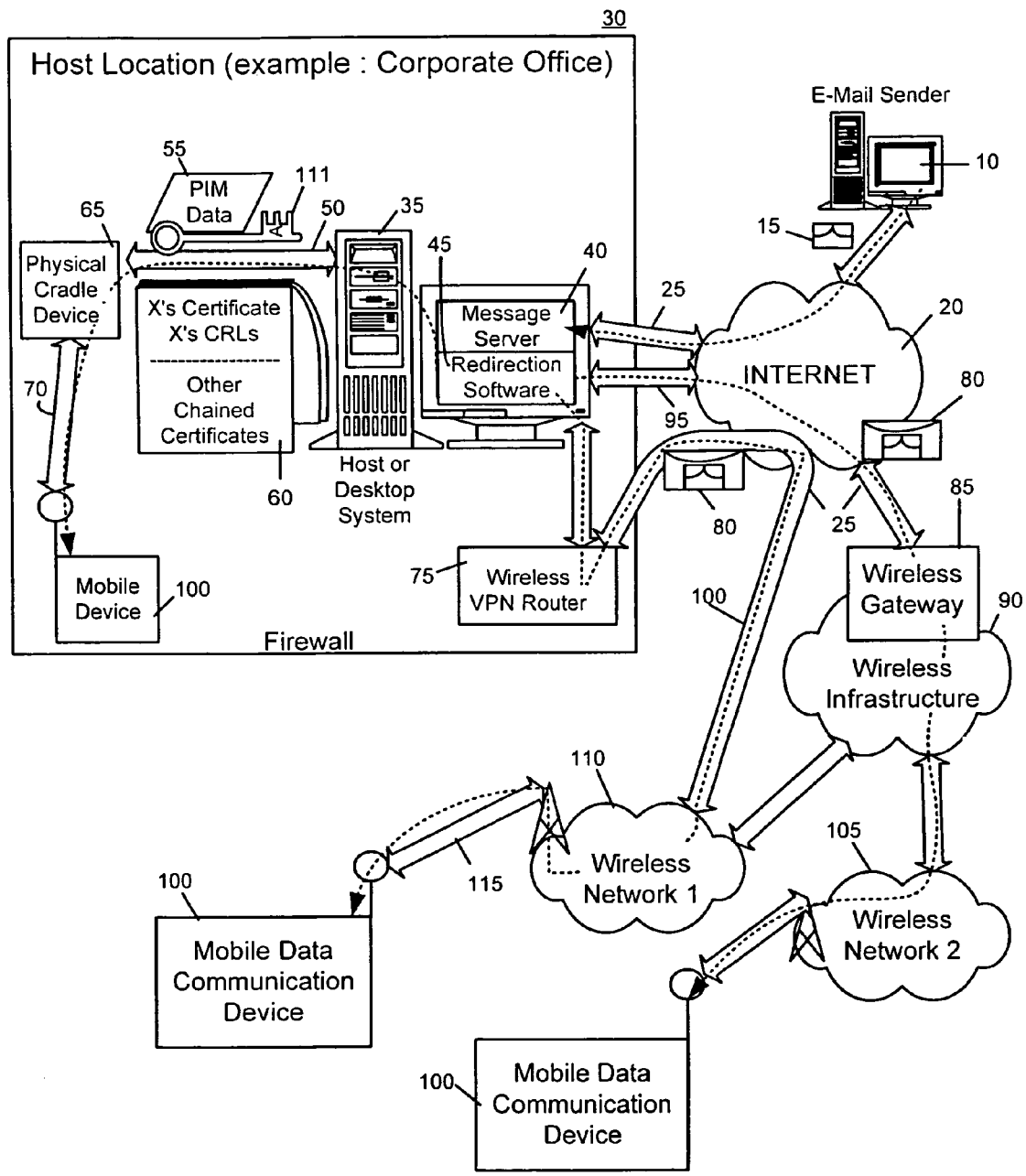
FIG. 2 is a block diagram of a further communication system for use with multiple devices.

FIG. 2 is a block diagram of a further example communication system including multiple networks and multiple mobile communication devices. The system of FIG. 2 is substantially similar to the FIG. 1 system, but includes a host system 30, a redirection program 45, a mobile device cradle 65, a wireless virtual private network (VPN) router 75, an additional wireless network 110 and multiple mobile communication devices 100. As described above in conjunction with FIG. 1, FIG. 2 represents an overview of a sample network topology. Although the encoded message processing systems and methods described herein may be applied to networks having many different topologies, the network of FIG. 2 is useful in understanding an automatic e-mail redirection system mentioned briefly above.

The central host system 30 will typically be a corporate office or other LAN, but may instead be a home office computer or some other private system where mail messages are being exchanged. Within the host system 30 is the message server 40, running on some computer within the firewall of the host system, that acts as the main interface for the host system to exchange e-mail with the Internet 20. In the system of FIG. 2, the redirection program 45 enables redirection of data items from the server 40 to a mobile communication device 100. Although the redirection program 45 is shown to reside on the same machine as the message server 40 for ease of presentation, there is no requirement that it must reside on the message server. The redirection program 45 and the message server 40 are designed to co-operate and interact to allow the pushing of information to mobile devices 100. In this installation, the redirection program 45 takes confidential and non-confidential corporate information for a specific user and redirects it out through the corporate firewall to mobile devices 100. A more detailed description of the redirection software 45 may be found in the commonly assigned U.S. Pat. No. 6,219,694 ("the '694 Patent"), entitled "System and Method for Pushing Information From A Host System To A Mobile Data Communication Device Having A Shared Electronic Address", and issued to the assignee of the instant application on Apr. 17, 2001,which is hereby incorporated into the present application by reference. This push technique may use a wireless friendly encoding, compression and encryption technique to deliver all information to a mobile device, thus effectively extending the security firewall to include each mobile device 100 associated with the host system 30.

As shown in FIG. 2, there may be many alternative paths for getting information to the mobile device 100. One method for loading information onto the mobile device 100 is through a port designated 50, using a device cradle 65. This method tends to be useful for bulk information updates often performed at initialization of a mobile device 100 with the host system 30 or a computer 35 within the system 30. The other main method for data exchange is over-the-air using wireless networks to deliver the information. As shown in FIG. 2, this may be accomplished through a wireless VPN router 75 or through a traditional Internet connection 95 to a wireless gateway 85 and a wireless infrastructure 90, as described above. The concept of a wireless VPN router 75 is new in the wireless industry and implies that a VPN connection could be established directly through a specific wireless network 110 to a mobile device 100. The possibility of using a wireless VPN router 75 has only recently been available and could be used when the new Internet Protocol (IP) Version 6 (IPV6) arrives into IP-based wireless networks. This new protocol will provide enough IP addresses to dedicate an IP address to every mobile device 100 and thus make it possible to push information to a mobile device 100 at any time. A principal advantage of using this wireless VPN router 75 is that it could be an off-the-shelf VPN component, thus it would not require a separate wireless gateway 85 and wireless infrastructure 90 to be used. A VPN connection would preferably be a Transmission Control Protocol (TCP)/IP or User Datagram Protocol (UDP)/IP connection to deliver the messages directly to the mobile device 100. If a wireless VPN 75 is not available then a link 95 to the Internet 20 is the most common connection mechanism available and has been described above.

In the automatic redirection system of FIG. 2, a composed e-mail message 15 leaving the e-mail sender 10 arrives at the message server 40 and is redirected by the redirection program 45 to the mobile device 100. As this redirection takes place the message 15 is re-enveloped, as indicated at 80, and a possibly proprietary compression and encryption algorithm can then be applied to the original message 15. In this way, messages being read on the mobile device 100 are no less secure than if they were read on a desktop workstation such as 35 within the firewall. All messages exchanged between the redirection program 45 and the mobile device 100 preferably use this message repackaging technique. Another goal of this outer envelope is to maintain the addressing information of the original message except the sender's and the receiver's address. This allows reply messages to reach the appropriate destination, and also allows the "from" field to reflect the mobile user's desktop address. Using the user's e-mail address from the mobile device 100 allows the received message to appear as though the message originated from the user's desktop system 35 rather than the mobile device 100.

With reference back to the port 50 and cradle 65 connectivity to the mobile device 100, this connection path offers many advantages for enabling one-time data exchange of large items. For those skilled in the art of personal digital assistants (PDAs) and synchronization, the most common data exchanged over this link is Personal Information Management (PIM) data 55. When exchanged for the first time this data tends to be large in quantity, bulky in nature and requires a large bandwidth to get loaded onto the mobile device 100 where it can be used on the road. This serial link may also be used for other purposes, including setting up a private security key 111 such as an S/MIME or PGP specific private key, the Certificate (Cert) of the user and their Certificate Revocation Lists (CRLs) 60. The private key is preferably exchanged so that the desktop 35 and mobile device 100 share one personality and one method for accessing all mail. The Cert and CRLs are normally exchanged over such a link because they represent a large amount of the data that is required by the device for S/MIME, PGP and other public key security methods.

Figure 3:
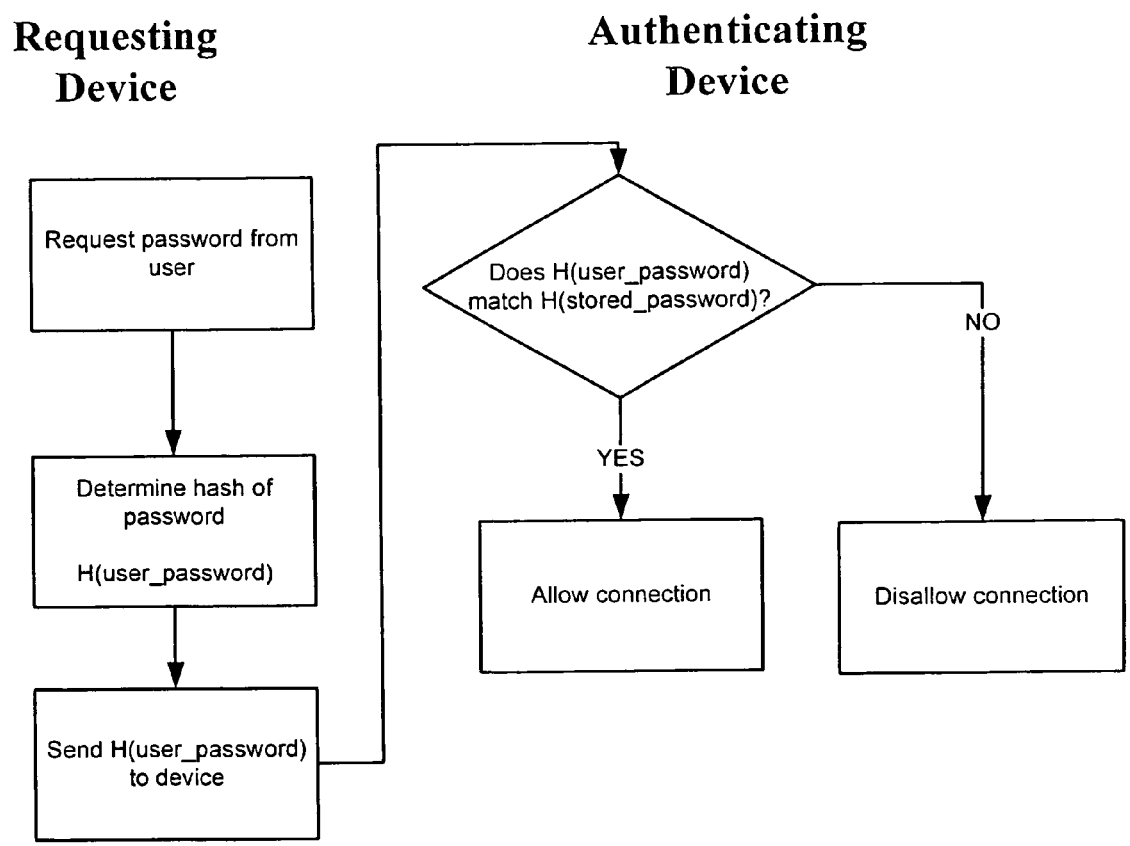
FIG. 3 is a schematic representation of a prior art challenge-response method.

FIG. 3 shows a typical challenge response scheme used by an authenticating device, such as mobile device 10 to authenticate a requesting device, such as desktop system 35 that may be requesting a connection to the device 10. When device 10 is connected to the desktop system 35, for instance through a serial link such as a universal serial bus (USB) link, the user of the desktop system 35 is prompted to enter a password in order to authenticate the user to the device 10. The desktop system 35 creates a one-way hash of the password provided by the user, and transmits the hash of the password to the device 10. The device 10 then compares the hash of the password to a stored hash of the device password. If the two values match, then the user is authenticated and the desktop system 35 is allowed to form a connection with the device 10. In this typical challenge response scheme, only the hash of the password is transmitted to the device 10. If the password itself were sent over the communications link, an attacker would be able to intercept the transmission and gain knowledge of the password.

Figure 4:
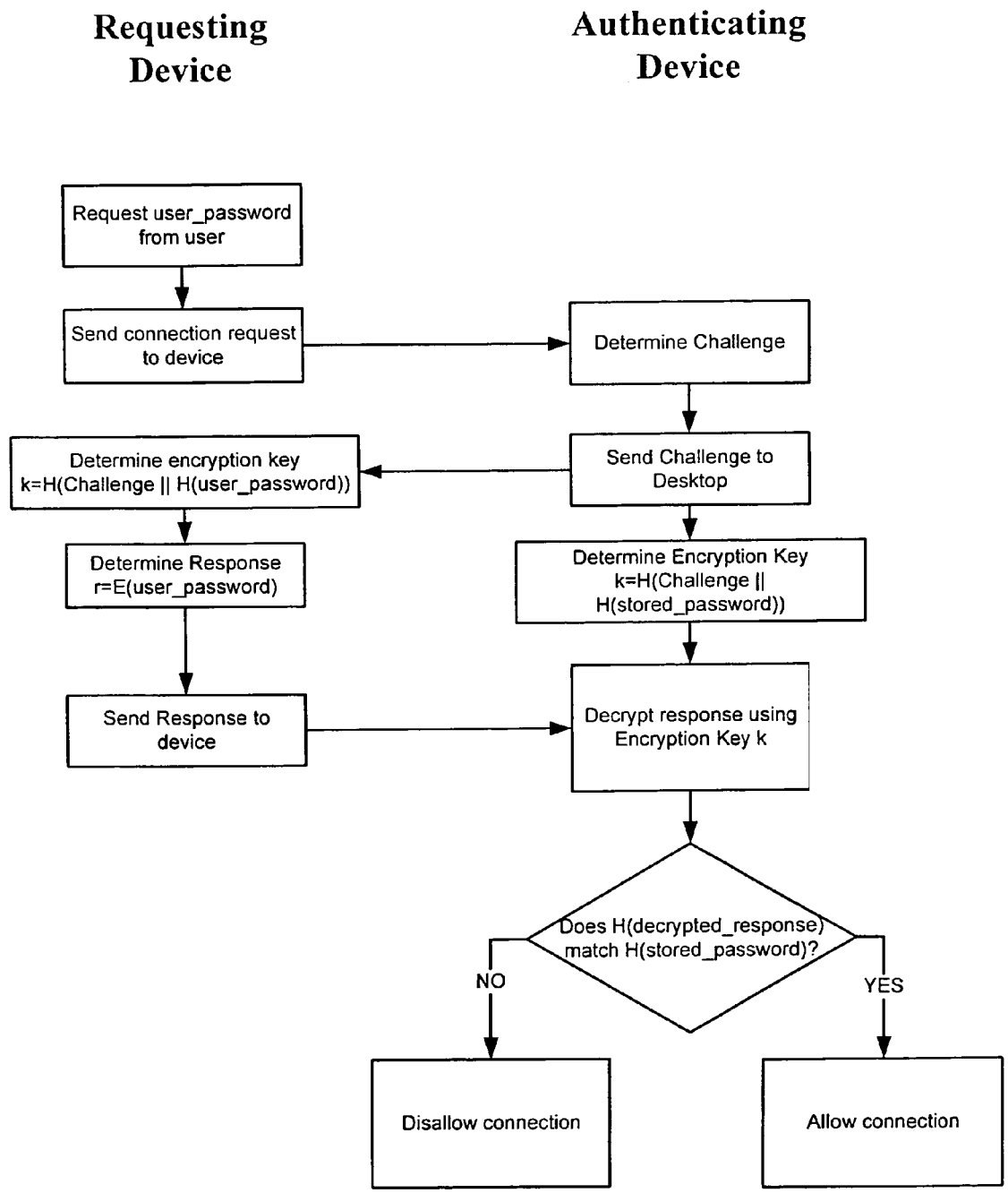
FIG. 4 is a schematic representation of challenge-response for a requesting device and authenticating device.

FIG. 4 illustrates a challenge response scheme in accordance with a preferred embodiment of the present invention. In the preferred embodiment, a requesting device, such as the desktop system 35, is connected to an authenticating device, such as mobile device 10, using a communications link, such as a universal serial bus (USB) link, through which the requesting device may send a connection request. The connection request may be in the form of a software request sent to the authenticating device, or the detection of a change in a hardware state of the communications link. The authenticating device detects that a connection is being requested, and proceeds to authenticate the requesting device in accordance with the challenge response scheme described below. It will be understood that the authenticating device may only initiate the challenge response scheme if the authenticating device has been secured by a device password (stored_password). In order to determine if a requesting device needs to be authenticated, the authenticating device may check for the presence of a hash of the device password H(stored_password) in a memory of the authenticating device. In other implementations, the authentication device may check for a flag indicating whether the device has been secured.

When the authenticating device detects a connection request, it generates a Challenge c to issue to the requesting device. The Challenge c may be a group of bits that have been randomly generated by the authenticating device. Alternatively, the numbers of bits used in the Challenge c may also be randomized. The authenticating device may use a hardware-based random number generator or a software-based random number generator to generate the random Challenge c.

The requesting device prompts the user of the requesting device for a password user_password. This password is hashed, using known hashing functions such as SHA-1, to create H(user_password) which is then combined with the Challenge c received from the authenticating device. In the preferred embodiment, the Challenge c and the hash of the password H(user_password) are concatenated together. It is understood that there are different ways in which to combine the two values. This combination of the Challenge c and the hash of the password H(user_password) is further hashed in order to generate a requesting encryption key $k_r = H(c \| H(user\_password))$ that is used in creating a response r to the challenge issued by the authenticating device. The response r is generated by encrypting the password user_password using known techniques such as AES or TripleDES. In some implementations, the response r may also be generated by applying the XOR function to the requesting encryption key $k_r$ and the password user_password. The response r is then transmitted to the authenticating device.

The authenticating device determines an authenticating encryption key $k_a$ by following a process similar to that followed by the requesting device. The authenticating device combines the stored hash of the device password H(stored_password) with the randomly generated Challenge c, and then generates a hash of the combination, in order to generate the authenticating encryption key $k_a$=H(c||H(stored_password)). The authenticating encryption key $k_a$ is used to decrypt the response r received from the requesting device. A hash of the decrypted response H(decrypted_response) is then compared to the stored hash of the device password H(stored_password). If the two hashes match, then the decrypted response was the correct device password. Thus the authenticating device has authenticated the requesting device. The authenticating device is also in possession of the device password for use in operations that require the device password. If the two hashes do not match, then the user did not provide the correct password, and the authenticating device rejects the connection request from the requesting device, and thereby disallows the connection.

In a further embodiment, the device password is concatenated with a random salt s, then hashed and stored in the memory of the authenticating device together with s. Therefore the authenticating device stores (s, H(s||stored_password)). When the challenge c is transmitted to the requesting device, the salt s is likewise transmitted, and the requesting device then hashes a concatenation of s and user_password to generate an authenticating encrypting key $k_r$=H(c||H(s||user_password)) using the process described above. Once the response r is transmitted to the authenticating device, the authenticating device determines an authenticating encryption key $k_a$=H(c||H(s||stored_password)) by following a process similar to that described above. The authenticating encryption key $k_a$ is used to decrypt the response r received from the requesting device. A hash of the decrypted response H(decrypted_response) is then compared to the stored hash of the salted device password H(s||stored_password). If the two hashes match, then the decrypted response was the correct device password.

The systems and methods disclosed herein are presented only by way of example and are not meant to limit the scope of the invention. Other variations of the systems and methods described above will be apparent to those skilled in the art and as such are considered to be within the scope of the invention. For example, it should be understood that steps and the order of the steps in the processing described herein may be altered, modified and/or augmented and still achieve the desired outcome.

Figure 5:
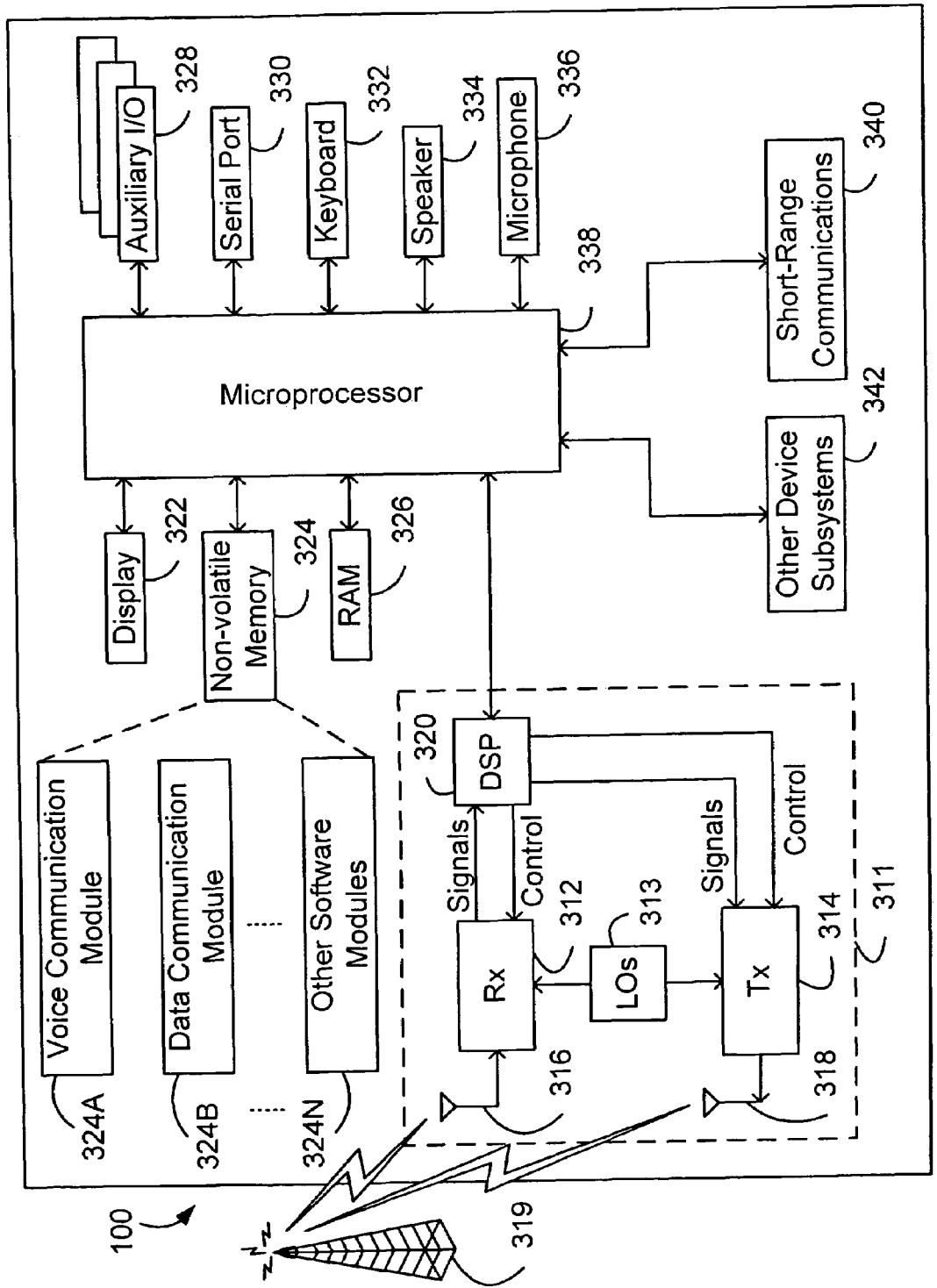
FIG. 5 is a block diagram of a mobile communication device for use with the method illustrated in FIG. 4.

As another example, the systems and methods disclosed herein may be used with many different computers and devices, such as a wireless mobile communications device shown in FIG. 5. With reference to FIG. 5, the mobile device 100 is a dual-mode mobile device and includes a transceiver 311, a microprocessor 338, a display 322, non-volatile memory 324, random access memory (RAM) 326, one or more auxiliary input/output (I/O) devices 328, a serial port 330, a keyboard 332, a speaker 334, a microphone 336, a short-range wireless communications sub-system 340, and other device sub-systems 342.

The transceiver 311 includes a receiver 312, a transmitter 314, antennas 316 and 318, one or more local oscillators 313, and a digital signal processor (DSP) 320. The antennas 316 and 318 may be antenna elements of a multiple-element antenna, and are preferably embedded antennas. However, the systems and methods described herein are in no way restricted to a particular type of antenna, or even to wireless communication devices.

The mobile device 100 is preferably a two-way communication device having voice and data communication capabilities. Thus, for example, the mobile device 100 may communicate over a voice network, such as any of the analog or digital cellular networks, and may also communicate over a data network. The voice and data networks are depicted in FIG. 5 by the communication tower 319. These voice and data networks may be separate communication networks using separate infrastructure, such as base stations, network controllers, etc., or they may be integrated into a single wireless network.

The transceiver 311 is used to communicate with the network 319, and includes the receiver 312, the transmitter 314, the one or more local oscillators 313 and the DSP 320. The DSP 320 is used to send and receive signals to and from the transceivers 316 and 318, and also provides control information to the receiver 312 and the transmitter 314. If the voice and data communications occur at a single frequency, or closely-spaced sets of frequencies, then a single local oscillator 313 may be used in conjunction with the receiver 312 and the transmitter 314. Alternatively, if different frequencies are utilized for voice communications versus data communications for example, then a plurality of local oscillators 313 can be used to generate a plurality of frequencies corresponding to the voice and data networks 319. Information, which includes both voice and data information, is communicated to and from the transceiver 311 via a link between the DSP 320 and the microprocessor 338.

The detailed design of the transceiver 311, such as frequency band, component selection, power level, etc., will be dependent upon the communication network 319 in which the mobile device 100 is intended to operate. For example, a mobile device 100 intended to operate in a North American market may include a transceiver 311 designed to operate with any of a variety of voice communication networks, such as the Mobitex or DataTAC mobile data communication networks, AMPS, TDMA, CDMA, PCS, etc., whereas a mobile device 100 intended for use in Europe may be configured to operate with the GPRS data communication network and the GSM voice communication network. Other types of data and voice networks, both separate and integrated, may also be utilized with a mobile device 100.

Depending upon the type of network or networks 319, the access requirements for the mobile device 100 may also vary. For example, in the Mobitex and DataTAC data networks, mobile devices are registered on the network using a unique identification number associated with each mobile device. In GPRS data networks, however, network access is associated with a subscriber or user of a mobile device. A GPRS device typically requires a subscriber identity module ("SIM"), which is required in order to operate a mobile device on a GPRS network. Local or non-network communication functions (if any) may be operable, without the SIM device, but a mobile device will be unable to carry out any functions involving communications over the data network 319, other than any legally required operations, such as '911' emergency calling.

After any required network registration or activation procedures have been completed, the mobile device 100 may the send and receive communication signals, including both voice and data signals, over the networks 319. Signals received by the antenna 316 from the communication network 319 are routed to the receiver 312, which provides for signal amplification, frequency down conversion, filtering, channel selection, etc., and may also provide analog to digital conversion. Analog to digital conversion of the received signal allows more complex communication functions, such as digital demodulation and decoding to be performed using the DSP 320. In a similar manner, signals to be transmitted to the network 319 are processed, including modulation and encoding, for example, by the DSP 320 and are then provided to the transmitter 314 for digital to analog conversion, frequency up conversion, filtering, amplification and transmission to the communication network 319 via the antenna 318.

In addition to processing the communication signals, the DSP 320 also provides for transceiver control. For example, the gain levels applied to communication signals in the receiver 312 and the transmitter 314 may be adaptively controlled through automatic gain control algorithms implemented in the DSP 320. Other transceiver control algorithms could also be implemented in the DSP 320 in order to provide more sophisticated control of the transceiver 311.

The microprocessor 338 preferably manages and controls the overall operation of the mobile device 100. Many types of microprocessors or microcontrollers could be used here, or, alternatively, a single DSP 320 could be used to carry out the functions of the microprocessor 338. Low-level communication functions, including at least data and voice communications, are performed through the DSP 320 in the transceiver 311. Other, high-level communication applications, such as a voice communication application 324A, and a data communication application 324B may be stored in the non-volatile memory 324 for execution by the microprocessor 338. For example, the voice communication module 324A may provide a high-level user interface operable to transmit and receive voice calls between the mobile device 100 and a plurality of other voice or dual-mode devices via the network 319. Similarly, the data communication module 324B may provide a high-level user interface operable for sending and receiving data, such as e-mail messages, files, organizer information, short text messages, etc., between the mobile device 100 and a plurality of other data devices via the networks 319. The microprocessor 338 also interacts with other device subsystems, such as the display 322, the RAM 326, the auxiliary input/output (I/O) subsystems 328, the serial port 330, the keyboard 332, the speaker 334, the microphone 336, the short-range communications subsystem 340 and any other device subsystems generally designated as 342.

Some of the subsystems shown in FIG. 5 perform communication-related functions, whereas other subsystems may provide "resident" or on-device functions. Notably, some subsystems, such as the keyboard 332 and the display 322 may be used for both communication-related functions, such as entering a text message for transmission over a data communication network, and device-resident functions such as a calculator or task list or other PDA type functions.

Operating system software used by the microprocessor 338 is preferably stored in a persistent store such as non-volatile memory 324. The non-volatile memory 324 may be implemented, for example, as a Flash memory component, or as battery backed-up RAM. In addition to the operating system, which controls low-level functions of the mobile device 310, the non-volatile memory 324 includes a plurality of software modules 324A-324N that can be executed by the microprocessor 338 (and/or the DSP 320), including a voice communication module 324A, a data communication module 324B, and a plurality of other operational modules 324N for carrying out a plurality of other functions. These modules are executed by the microprocessor 338 and provide a high-level interface between a user and the mobile device 100. This interface typically includes a graphical component provided through the display 322, and an input/output component provided through the auxiliary I/O 328, keyboard 332, speaker 334, and microphone 336. The operating system, specific device applications or modules, or parts thereof, may be temporarily loaded into a volatile store, such as RAM 326 for faster operation. Moreover, received communication signals may also be temporarily stored to RAM 326, before permanently writing them to a file system located in a persistent store such as the Flash memory 324.

An exemplary application module 324N that may be loaded onto the mobile device 100 is a personal information manager (PIM) application providing PDA functionality, such as calendar events, appointments, and task items. This module 324N may also interact with the voice communication module 324A for managing phone calls, voice mails, etc., and may also interact with the data communication module for managing e-mail communications and other data transmissions. Alternatively, all of the functionality of the voice communication module 324A and the data communication module 324B may be integrated into the PIM module.

The non-volatile memory 324 preferably also provides a file system to facilitate storage of PIM data items on the device. The PIM application preferably includes the ability to send and receive data items, either by itself, or in conjunction with the voice and data communication modules 324A, 324B, via the wireless networks 319. The PIM data items are preferably seamlessly integrated, synchronized and updated, via the wireless networks 319, with a corresponding set of data items stored or associated with a host computer system, thereby creating a mirrored system for data items associated with a particular user.

Context objects representing at least partially decoded data items, as well as fully decoded data items, are preferably stored on the mobile device 100 in a volatile and non-persistent store such as the RAM 326. Such information may instead be stored in the non-volatile memory 324, for example, when storage intervals are relatively short, such that the information is removed from memory soon after it is stored. However, storage of this information in the RAM 326 or another volatile and non-persistent store is preferred, in order to ensure that the information is erased from memory when the mobile device 100 loses power. This prevents an unauthorized party from obtaining any stored decoded or partially decoded information by removing a memory chip from the mobile device 100, for example.

The mobile device 100 may be manually synchronized with a host system by placing the device 100 in an interface cradle, which couples the serial port 330 of the mobile device 100 to the serial port of a computer system or device. The serial port 330 may also be used to enable a user to set preferences through an external device or software application, or to download other application modules 324N for installation. This wired download path may be used to load an encryption key onto the device, which is a more secure method than exchanging encryption information via the wireless network 319. Interfaces for other wired download paths may be provided in the mobile device 100, in addition to or instead of the serial port 330. For example, a USB port would provide an interface to a similarly equipped personal computer.

Additional application modules 324N may be loaded onto the mobile device 100 through the networks 319, through an auxiliary I/O subsystem 328, through the serial port 330, through the short-range communications subsystem 340, or through any other suitable subsystem 342, and installed by a user in the non-volatile memory 324 or RAM 326. Such flexibility in application installation increases the functionality of the mobile device 100 and may provide enhanced on-device functions, communication-related functions, or both. For example, secure communication applications may enable electronic commerce functions and other such financial transactions to be performed using the mobile device 100.

When the mobile device 100 is operating in a data communication mode, a received signal, such as a text message or a web page download, is processed by the transceiver module 311 and provided to the microprocessor 338, which preferably further processes the received signal in multiple stages as described above, for eventual output to the display 322, or, alternatively, to an auxiliary I/O device 328. A user of mobile device 100 may also compose data items, such as e-mail messages, using the keyboard 332, which is preferably a complete alphanumeric keyboard laid out in the QWERTY style, although other styles of complete alphanumeric keyboards such as the known DVORAK style may also be used. User input to the mobile device 100 is further enhanced with a plurality of auxiliary I/O devices 328, which may include a thumbwheel input device, a touchpad, a variety of switches, a rocker input switch, etc. The composed data items input by the user may then be transmitted over the communication networks 319 via the transceiver module 311.

When the mobile device 100 is operating in a voice communication mode, the overall operation of the mobile device is substantially similar to the data mode, except that received signals are preferably be output to the speaker 334 and voice signals for transmission are generated by a microphone 336. Alternative voice or audio I/O subsystems, such as a voice message recording subsystem, may also be implemented on the mobile device 100. Although voice or audio signal output is preferably accomplished primarily through the speaker 334, the display 322 may also be used to provide an indication of the identity of a calling party, the duration of a voice call, or other voice call related information. For example, the microprocessor 338, in conjunction with the voice communication module and the operating system software, may detect the caller identification information of an incoming voice call and display it on the display 322.

A short-range communications subsystem 340 is also included in the mobile device 100. The subsystem 340 may include an infrared device and associated circuits and components, or a short-range RF communication module such as a BLUETOOTH® module or an 802.11 module, for example, to provide for communication with similarly-enabled systems and devices. Those skilled in the art will appreciate that "BLUETOOTH" and "802.11" refer to sets of specifications, available from the Institute of Electrical and Electronics Engineers, relating to wireless personal area networks and wireless local area networks, respectively.

The systems' and methods' data may be stored in one or more data stores. The data stores can be of many different types of storage devices and programming constructs, such as RAM, ROM, Flash memory, programming data structures, programming variables, etc. It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code.

We claim:

1. A method for authentication of a requesting device by an authenticating device, the requesting device and the authenticating device each being operative to carry out a one-way hash operation and to carry out a key-based encryption operation, the authenticating device storing a hash of a defined password generated by applying the one-way hash operation to the defined password, the authenticating device being further operative to carry out a key-based decryption operation for decrypting values obtained from the key-based encryption operation, the method comprising the steps of:

the requesting device receiving a user password and carrying out the one-way hash operation on the user password to obtain a hash of the user password, the authenticating device determining and transmitting a challenge to the requesting device;

the requesting device receiving the challenge and defining a requesting encryption key by carrying out the one-way hash operation on a combination of the challenge and the hash of the user password, the requesting device carrying out the key-based encryption operation using the requesting encryption key to encrypt the user password, the requesting device transmitting a response comprising the encrypted user password to the authenticating device, the authenticating device receiving the response and defining an authenticating encryption key by carrying out the one-way hash operation on a combination of the challenge and the hash of the defined password;

the authenticating device using the authenticating encryption key in the key-based decryption operation to decrypt the response to obtain a decrypted user password and carrying out the one-way hash operation on the decrypted user password;

the authenticating device comparing the hash of the decrypted user password with the hash of the defined password to authenticate the requesting device when the comparison indicates a match.

2. The method of claim 1 further comprising:

the authenticating device using the decrypted user password to carry out operations on the authenticating device.

3. The method of claim 1 in which the authenticating device comprises a wireless handheld device and the requesting device comprises a desktop computer and in which the authentication of the requesting device is required to establish a connection between the wireless handheld device and the requesting device, the method further comprising:

the requesting device sending a connection request to the authenticating device prior to the authenticating device determining a challenge, and refusing to establish a connection when the one-way hash of the decrypted user password does not match the hash of the defined password.

4. The method of claim 1, in which the step of the authenticating device determining and transmitting a challenge comprises generating a random number to be used as the challenge.

5. The method of claim 1, further comprising an initial step of the requesting device transmitting a connection request to the authenticating device and comprising the step of the authentication device receiving the connection request and carrying out the authentication of the requesting device if a defined flag is set on the authenticating device to indicate that the authenticating device has been secured with the defined password.

6. A computing device program product comprising a computer-readable medium embodying code operative, when implemented on a computing system, to perform the method of claim 1.

7. A computing device program product comprising a computer-readable medium embodying code operative, when implemented on a computing system, to perform the method of claim 2.

8. A computing device program product comprising a computer-readable medium embodying code operative, when implemented on a computing system, to perform the method of claim 3.

9. A computing device program product comprising a computer-readable medium embodying code operative, when implemented on a computing system, to perform the method of claim 4.

10. A computing device program product comprising a computer-readable medium embodying code operative, when implemented on a computing system, to perform the method of claim 5.

11. A system for an authentication device to authenticate a requesting device, comprising:
   a challenge generator for generating a challenge,
   a communications link for transmitting the challenge to the requesting device and receiving a response to the challenge from the requesting device, the response comprising a requesting password encrypted using a requesting encryption key, the requesting encryption key comprising a hash of a combination of the challenge and a hash of the requesting password;
   a hash generator for generating an authenticating encryption key by hashing a combination of the challenge and a hash of a predetermined password;
   a decryptor for decrypting the encrypted requesting password using the authenticating encryption key to obtain a decrypted response; and
   a comparator for comparing a hash of the decrypted response with the hash of the predetermined password, whereby if the hash of the decrypted requesting password matches the hash of the predetermined password, the requesting device is authenticated.

12. The system of claim 11, wherein the challenge generated by the challenge generator is a random or pseudo-random number.

13. The system of claim 11, wherein the communications link is further configured to receive an authentication request from the requesting device.

14. The system of claim 11, further comprising an authentication flag for indicating whether the authentication device has been secured with the predetermined password.

15. A method for securely transmitting a password to a receiving device, the receiving device being provided with a hash of a predetermined password, a random number, and a receiving encryption key comprising a hash of the random number and the hash of the predetermined password, comprising the steps of:
   receiving a random number from the receiving device;
   encoding the password to produce a hash of the password;
   combining the random number with the hash of the password;
   hashing the combined random number and hash of the password to produce a transmitting encryption key;
   encrypting the password using the transmitting encryption key;
   transmitting the encrypted password to the receiving device for decryption by the receiving device using the receiving encryption key.

16. A computing device program product comprising code embodied on a computer-readable medium operative, when implemented on a computing device, to perform the method of claim 15.

17. A method for authentication of a requesting device by an authenticating device, the requesting device and the authenticating device each being operative to carry out a one-way hash operation and to carry out a key-based encryption operation, the authenticating device storing a hash of a defined password generated by applying the one-way hash operation to the defined password, the authenticating device being further operative to carry out a key-based decryption operation for decrypting values obtained from the encryption operation, the method comprising the authenticating device:
   determining and transmitting a challenge to the requesting device;
   receiving a response from the requesting device, the response comprising a requesting encryption key determined by carrying out the hash operation on a combination of the challenge and a hash of a received user password, the hash being defined by carrying out the hash operation on the received user password,
   defining an authenticating encryption key by carrying out the hash operation on a combination of the challenge and the hash of the defined password;
   using the authenticating encryption key in the decryption operation to decrypt the response to obtain a decrypted user password and carrying out the one-way hash operation on the decrypted user password;
   comparing the hash of the decrypted user password with the hash of the defined password to authenticate the requesting device when the comparison indicates a match.

18. The method of claim 17 further comprising: the authenticating device using the decrypted user password to carry out operations on the authenticating device.

19. The method of claim 17 in which the authenticating device comprises a wireless handheld device and the requesting device comprises a desktop computer and in which the authentication of the requesting device is required to establish a connection between the wireless handheld device and the requesting device, the method further comprising:
   the authenticating device receiving a connection request prior to the authenticating device determining a challenge, and
   refusing to establish a connection when the hash of the decrypted user password does not match the hash of the defined password.

20. The method of claim 17, in which the authenticating device determining and transmitting the challenge to the requesting device comprises generating a random number to be used as the challenge.

21. The method of claim 17, further comprising an initial step of the authentication device receiving from the requesting device a connection request and carrying out the authentication of the requesting device if a defined flag is set on the authenticating device to indicate that the authenticating device has been secured with the defined password.

22. A computing device program product comprising a computer-readable medium embodying code operative, when implemented on a computing device, to perform the method of claim 17.

23. A computing device program product comprising a computer-readable medium embodying code operative, when implemented on a computing device, to perform the method of claim 19.

24. A computing device program product comprising a computer-readable medium embodying code operative, when implemented on a computing device, to perform the method of claim 18.

* * * * *

UNITED STATES PATENT AND TRADEMARK OFFICE
CERTIFICATE OF CORRECTION

| | | |
|---|---|---|
| PATENT NO. | : 7,603,556 B2 | Page 1 of 1 |
| APPLICATION NO. | : 10/996369 | |
| DATED | : October 13, 2009 | |
| INVENTOR(S) | : Brown et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1254 days.

Signed and Sealed this

Fourteenth Day of December, 2010

David J. Kappos
*Director of the United States Patent and Trademark Office*